United States Patent [19]

Bytzek

[11] Patent Number: 4,689,037
[45] Date of Patent: Aug. 25, 1987

[54] BELT TENSIONING DEVICE WITH CONSTANT OR VARIABLY PROPORTIONAL DAMPING

[75] Inventor: Klaus K. Bytzek, Schomberg, Canada

[73] Assignee: Litens Automotive, Inc., Ontario, Canada

[21] Appl. No.: 871,874

[22] Filed: Jun. 9, 1986

[51] Int. Cl.⁴ .............................................. F16H 7/12
[52] U.S. Cl. .................................................... 474/135
[58] Field of Search .............. 474/135, 133, 115, 101, 474/109, 111; 267/136, 134, 137

[56] References Cited

U.S. PATENT DOCUMENTS

| | | | |
|---|---|---|---|
| 3,975,965 | 8/1976 | Speer | 474/135 |
| 4,144,772 | 3/1979 | Brackin et al. | 474/135 |
| 4,473,362 | 9/1984 | Thomey et al. | 474/135 |
| 4,536,172 | 8/1985 | Burris et al. | 474/135 |
| 4,557,707 | 12/1985 | Thomey | 474/135 |

*Primary Examiner*—James A. Leppink
*Assistant Examiner*—Thuy M. Bui
*Attorney, Agent, or Firm*—Cushman, Darby & Cushman

[57] ABSTRACT

In a belt tensioning device comprising a fixed structure, a pivoted structure mounted with respect to the fixed structure for pivotal movement about a first axis between first and second limiting positions, a belt engaging pulley rotatably carried by the pivoted structure for rotational movement about a rotational axis parallel with the pivotal axis, a spring acting between the fixed and pivoted structures for resiliently biasing the pivoted structure to move in a direction away from the first limiting position toward the second limiting position so as to tension a belt engaged by the pulley, and a damping mechanism for damping the pivotal movements of the pivoted structure about the pivotal axis. The damping mechanism includes a stack of damping elements having interengaging pairs of surfaces disposed transversely with respect to the pivotal axis so as to be slidable with respect to one another in spaced planes of revolution about the pivotal axis. The stack includes a first plurality of damping elements and a second plurality of damping elements which are disposed within the stack in alternate positions with respect to the damping elements of the first plurality and which are mounted on the fixed and printed structures respectively applied to the opposite end element of the will cause the pairs of interengaging surfaces of the stack elements to move together and create a predetermined sliding friction therebetween when the pivoted structure is moved with respect to the fixed structure about the pivotal axis so as to provide a predetermined damping of such movement.

13 Claims, 6 Drawing Figures

BELT TENSIONING DEVICE WITH CONSTANT OR VARIABLY PROPORTIONAL DAMPING

This invention relates to belt drive systems and more particularly to improvements in belt tensioners utilized in belt drive systems.

For many years, the automotive industry has used multiple individual V-belts to drive various rotary devices by the engine. Such a system of belt driven peripheral devices typically required the use of a pulley on the engine output shaft to separately receive multiple V-belts. Each separate V-belt was then mounted on the pulley and adjusted to drive a single, or in exceptional cases, two or more rotary devices. Each V-belt was adjusted and tightened by use of the adustable mount of the peripheral device. A problem arose with this type of system in that the replacement and adjustment of a belt was very time consuming and costly.

To help resolve this problem and to gain a generally more compact peripheral drive system, it has been found desirable to replace the typical multiple belt system with a system employing a single belt arranged in a serpetine fashion to drive all of the various rotary devices previously driven by separate belts. Adjustment of such a belt system would not be made by adjusting the mounts of individual peripheral devices, but instead a separate belt tensioning device might be commonly employed to function as an adjustment apparatus.

While belt tensioners have been used in many belt systems heretofore, the functional requirements placed upon belt tensioners used in serpetine single belt automotive systems are particularly stringent. The greater demands placed on a vehicular belt tensioner are due to the relatively great belt length and concomitant required take-up capacity. The belt tensioner is further subjected to operation over an extensive period of use in which great vibrational loads are imposed.

Damping requirements are essential in order to enable the system to function over an extended period on a pulsating machine without creating resonance. Where an air conditioning compressor constitutes one of the rotary devices of the system, a particularly onerous pulsating load is imposed upon the system as the compressor operates, and cuts in and out of operation.

The belt tensioner must also compensate for increases in belt length due to wear and other factors. A typical belt tensioner employs a fixed structure and a pivoted structure in the form of an arm carrying a belt engaging pulley. A coil spring biases the pivoted structure toward a position of maximum take-up so that the spring biasing force decreases as the pivoted structure moves from the position of minimum take-up to a position of maximum take-up. Even though the spring force varies within the range of movement of the pivoted arm, a substantially constant belt tension is maintained.

In addition to the belt take-up function of the belt tensioner, the tensioner must also dampen the belt system to eliminate harmonic spring vibration. Solid elastomeric bodies may be used to provide the spring force of a belt tensioner (e.g. U.S. Pat. Nos. 3,975,965 and 4,144,722) causing greater damping which is inherently provided by such springs as compared to springs commonly made from steel.

In Thomey et al (U.S. Pat. No. 4,473,362), a belt tensioner with variably proportional damping was described. The belt tensioner was a steel torsional spring type tensioner employing twin coils. A separate dampening mechanism was provided having damping characteristics that are not constant but vary proportionately with the position of the pivoted structure with respect to the fixed structure in a manner similar to a spring force. However, the amount of frictional variability and flexability in fine adjustment of this assembly is relatively limited.

An object of the present invention is to provide a belt tensioning device with a damping mechanism that enables high flexibility in adjusting damping characteristics of a belt tensioner to satisfy damping requirements imposed by specific operational conditions.

The present invention comprises a belt tensioning device having a fixed structure, a pivoted structure mounted with respect to the fixed structure for pivotal movement about a first axis between first and second limiting positions, a belt engaging pulley rotatably carried by the pivoted structure for rotational movement about a rotatational axis parallel with the pivotal axis, a spring acting between the fixed and pivoted structures for resiliently biasing the pivoted structure to move in a direction away from the first limiting position toward the second limiting position so as to tension a belt engaged by the pulley, and a damping mechanism for damping the pivotal movements of the pivoted structure about the pivotal axis; the improvement which comprises the damping mechanism includes: (1) a stack of damping elements having interengaging pairs of surfaces disposed transversely with respect to the pivotal axis so as to be slidable with respect to one another in spaced planes of revolution about the pivotal axis; (2) the stack including a first plurality of damping elements and a second plurality of damping elements which are disposed within the stack in alternate positions with respect to the damping elements of the first plurality; (3) a mechanism for connecting the first plurality of damping elements with the fixed structure, (a) against movement in the rotational planes of the interengaging surfaces thereof and (b) for movement relative to one another in the axial direction of the pivotal axis; (4) a mechanism for connecting the second plurality of damping elements (a) for movement with the pivoted structure about the pivotal axis so that the interengaging surfaces thereof will move in the rotational planes thereof with the pivoted structure and (b) for movement relative to one another in the axial direction of the pivotal axis; and (5) a mechanism for supporting one end element of the stack against movement in an axial direction away from the stack so that an axial force component acting in the direction applied to the opposite end element of the stack will cause the pairs of interengaging surfaces of the stack elements to move together and create a predetermined sliding friction therebetween when the pivoted structure is moved with respect to the fixed structure about the pivotal axis so as to provide a predetermined damping of such movement.

In accordance with the principles of the present invention the objective of providing a damping mechanism with highly flexible adjustment, is obtained by providing at least a major part of the damping of the belt tensioning device by means of a separate damping mechanism which employs a number of frictionally slidable elements which upon application of a compression force increases friction between the elements and thereby creates an increased damping effect. The compression force may be constant or may be variably proportional to the pivot movement of the belt tensioner arm. Where the normal operating characteristics of the system are such that a relatively high amount of damping is required and the vibrational amplitudes encountered are relatively low, it is desirable to form the damping elements of an elastomeric material or other high friction material. Such a material may provide a high degree of internal deformation with an attendant high degree of solid damping. These characteristics combine to perform sequential actions which are desirable in a system having high frequency—low amplitude vibrational characteristics. The damping elements may be composed of different materials which may be mixed to provide a spectrum of damping characteristics. At the low friction end of the dampening material spectrum, a low friction material such as Zytel or metal may be used when the belt tensioning system does not require a large amount of damping but nevertheless requires damping of high amplitudes. In such a situation little internal deformation would occur but substantially all of the damping requirements would be met by sliding friction. Where a system presents both high frequency and high amplitude conditions, damping elements having a predominantly sliding friction damping action is preferred because solid damping-sliding friction damping as with an elastomeric material results in more rapid wear which is exacerbated by excess heat conditions.

The flexibility of adjusting damping characteristics by providing frictionally slidable elements is enhanced by not only the ability to use slidable elements composed of materials having different coefficients of friction as described above, but elements of varying thicknesses as well. The amount of surface area of each damping element is generally relatively large compared to the thickness of the element. This feature enables each element to have a significant damping effect. Varying the thickness of the damping elements varies the surface area which in turn alters the amount of surface friction and resulting damping effect. Thicker elements which are formed from elastomeric materials may dampen by internal deformation.

Another object of the present invention is to provide a belt tensioning device of the type described which is simple in construction, economical to manufacture and effective in operation.

These and other objects of the present invention will become more apparent during the course of the following detailed description and appended claims.

The invention may best be understood with reference to the accompanying drawings, wherein two illustrative embodiments are shown.

DETAILED DESCRIPTION OF THE DRAWINGS

Figure 1:
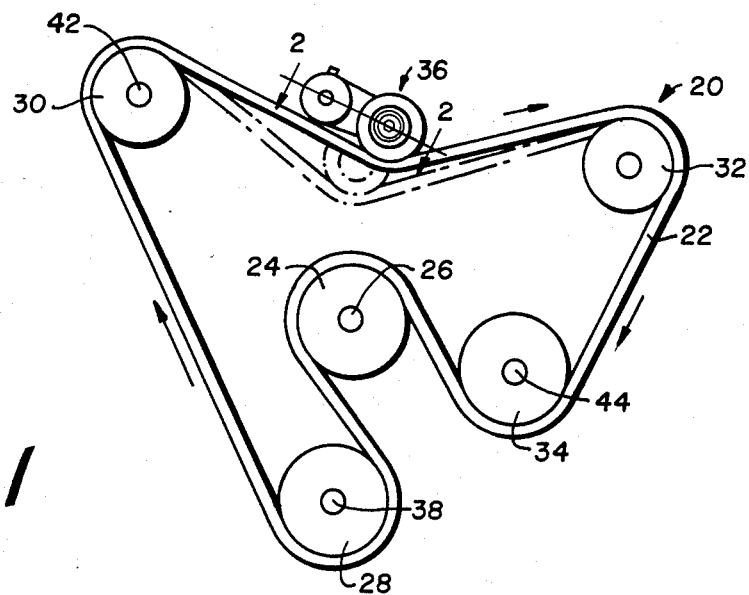
FIG. 1 is a front elevational view of an automotive serpentine belt system embodying a belt tensioning device constructed in accordance with the principals of the present invention.

Referring now more particularly to the drawings, there is shown in FIG. 1, an automotive serpentine belt system, generally indicated at 20, which includes a relatively large endless poly-v belt 22, a drive pulley 24 connected to the output shaft 26 of the automobile engine, four driven pulleys 28, 30, 32 and 34 and a belt tensioner generally indicated at 36 which embodies the principals of the present invention. The system 20 as shown is exemplary of the type of system described in the previously identified patent, Thomey et al. (U.S. Pat. No. 4,473,362). In the arrangement shown in FIG. 1, driven pulley 28 may be operatively connected with a shaft 38 for a cooling fan, driven pulley 30 may be mounted on a shaft 42 which forms a part of an alternator or the like, and driven pulley 34 is mounted on a shaft 44 which forms a part of an air conditioning compressor. It will be understood that the belt 22 is trained about the various pulleys in the manner indicated in the drawings and the belt tensioner 36 is mounted in operative relation with the belt so as to be capable of moving into a position enabling the belt to be mounted on the other rotary devices and then release to provide a desired tension to the belt in normal operative condition. The belt tensioner 36 also provides the application of a substantially constant tension to the belt 22 of the system 20 over an extended period of time during which the belt tends to become longer. For example, the solid line position of the belt tensioner illustrates the initial condition of the belt with the belt tensioner 36 in a minimum belt take-up position whereas the dotted line position illustrates a maximum belt take-up position which may occur after extended use and the belt has been elongated.

Figure 2:
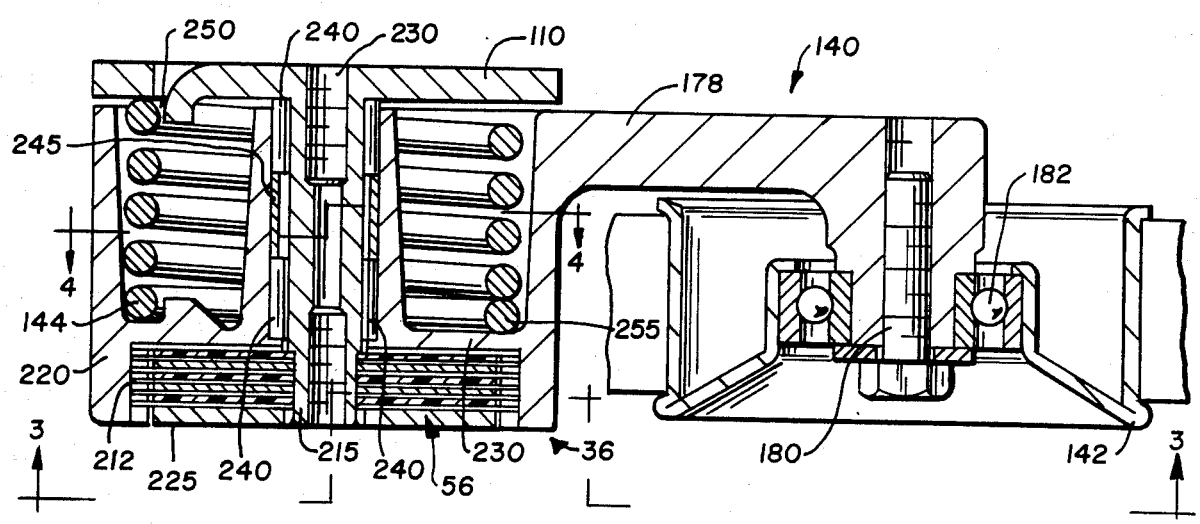
FIG. 2 is a cross-sectional view of a first embodiment taken along the line 2—2 of FIG. 1.

Referring now more particular to FIG. 2 of the drawings the belt tensioner 36 includes a bracket plate 110 which is secured in a stationary position with respect to the engine block. The belt tensioner also includes a pivoted structure 140 which is mounted with respect to the bracket plate 110 for a pivotal movement about a fixed axis between the first and second limiting positions. The pivoted structure 140 carries a belt engaging pulley 142 for rotational movement about a second axis parallel with the first axis. The pulley 142 may for example, be formed from mild steel sheet metal. The free end of the arm portion 178 of the pivoted structure 140 has a bolt shaft 180 which the pulley 142 is journalled, as by a ball bearing 182 or the like. The arm 178 may for example, be formed from die cast aluminium. A coil spring 144 is mounted between the fixed bracket plate 110 and pivoted structure 140 for resiliently biasing the latter to move in a direction away from the first limiting position toward the second limiting position with a spring force which decreases as the pivoted structure is moved in a direction away from the first position toward the second position. The coil spring 144 may for example be formed from 0.250 inch to 0.285 inch diameter spring steel. The second position of the belt tensioner 36 corresponds generally with the dotted line position shown in FIG. 1.

In accordance with the principals of the present invention, belt tensioner 36 also includes a damping mechanism, generally indicated at 56, which serves in operation to provide damping by a damping force which decreases as the pivoted structure 140 is moved in a direction away from its first position toward the second position thereof. The damping mechanism 56 is shown to consist of a plurality of damping elements 212 which for example may be of a disk shape. The damping elements are frictionally slidable with one another and include a first plurality thereof, having elements attached alternately, respectively, to the outer housing 220 and interior shaft 215 by peripheral means for engagement including splines, which are fixed for example by complementary splines formed in the housing 220 and interior shaft. The damping elements 212 may also be alternately fixed interiorally by circular or elongated holes or arms fixed by rigid perpendicular pins (not shown) to at least one of the damping body retaining ring 225 and interior support member 230 of the spring housing structure 220. The damping body retaining ring 225 is rigidly fixed to an interior fixed shaft 215 which is in turn rigidly fixed to the fixed bracket plate 110. The interior shaft 215 has a central opening 230 which is a threaded or thru hole, for receiving a bolt or the like for fastening the tensioning device 36 from either side to an engine mount or the like. A tang or hole (not shown) in retaining ring 225 or bracket 110 is provided to ensure positive location and prevent rotation of the tensioner 36. The interior shaft 215 may for example be formed from a steel forging integral with the retaining ring 225, or the shaft 215 and retaining ring 225 may be securely "staked" or welded together. At the axial periphery of the interior shaft 215 are bearings 240 separated by a bearing spacer 245. The bearings 240, may for example be two steel needle bearings or a combination of one needle bearing and one nylon (Zytel) bearing. The bearing spacer 245 may for example be a carbon steel sleeve. The spring housing 220 rotates about the interior shaft 215 using the bearings 240 to reduce friction therebetween. When the pivoted structure 140 is moved to a second position the spring 144 tightens and axially contracts to consequently elongate the spring. Thus, where a first end 250 of the spring presses against the fixed bracket plate 110 and the second end 255 of the spring presses against the interior support member 230 of the housing, the interior support member 230 in turn presses against the stack of damping elements 212 compressing them and upon sufficient pivoting action causing the damping elements to frictionally slide upon one another causing a damping of the pivoting movement. As the pivoting movement of the pivoted structure 140 becomes greater, the contraction and consequent elongation of the spring 144 becomes proportionately greater causing proportionately greater compression of the damping elements 212. Thus, in the embodiment of the present invention shown in FIG. 2 the damping effect on the pivoting movement is variably proportional to the amount of pivoting movement by the pivoted structure 140.

In the damping body 56, the damping elements 212 may have one alternately fixed set of elements composed of one material and the second set of alternately fixed elements composed of a second material or any combination of materials in both sets of dampening elements. Of the damping elements 212, one set of alternately fixed damping elements may be of one thickness and the second set of alternately fixed elements may be of a second thickness. The damping elements 212 may be of different thicknesses throughout the stack of said elements. The chosen materials and thickness of the damping elements 212 are selected in accordance with the principals of the present invention to suit the vibrational and pivotal movement characteristics of the system within which the belt tensioner 36 is used. When the system provides high frequency low amplitude vibrations it is preferable to employ an elastomeric material such as, elastomeric urethane, for example Type II Black urethane. While the durometer value of the urethane may vary, an exemplary durometer value is 90. Where an elastomeric material is employed and the damping elements are sufficiently thick, the operation of the damping body 56 is such as to provide two different sequential damping actions: first, a solid damping action or internal material displacement damping action; and second, a sliding friction damping action. The two types of damping actions take place sequentially in that solid damping only occurs where the amplitude of the vibration is below a threshold amplitude, while sliding friction damping will occur only after the threshold amplitude has been reached. It is important to note that the sliding friction damping action varies proportionately as aforesaid and that the threshold amplitude likewise varies proportionately.

Where the system has relatively low frequency but high amplitude vibrational characteristics, a preferred material for the damping elements 212 is Zytel 103HSL (nylon made by DuPont). Where Zytel is utilized as the material for the damping elements 212, the damping action provided is essentially all sliding friction damping with the amount of solid damping by internal displacement being relatively insignificantly. Alternatively, it may be considered that there is some sequential solid dampening action provided but with a threshold amplitude very close to zero. Since the operation with the elastomeric urethane material includes both the same type of operation as the Zytel material plus another type of operation in sequence therebefore, the prior description of the operation with urethane should suffice to give an understanding of both.

Where the system has both high frequency and high amplitude vibrational characteristics, the Zytel material is preferred over the elastomeric urethane material, although the provision of other damping means within the system sufficient to reduce either the frequency or amplitude, may be in order. For example, it may be desirable to utilize a pulley having an elastomeric hub either on the main engine drive shaft or the compressor shaft or both. Note that in using non-elastomeric materials that the combination of damping elements may be for example of steel and Zytel, steel and bronze, steel and fiber or many other materials. Note also that friction produced by the damping body may be increased or decreased by the number of damping elements used in the damping body 56.

Figure 3:
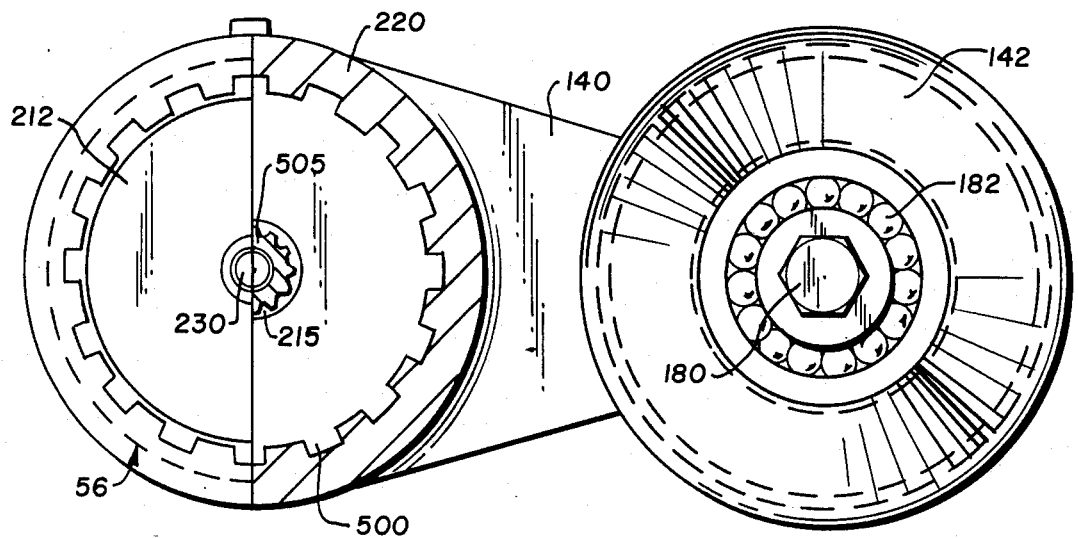
FIG. 3 is a cross-sectional view of the pivoted and fixed structures of the first embodiment taken along the line 3—3 of FIG. 2.

FIG. 3 shows by another cross-sectional view of the first embodiment, the pivoted structure 140, with the pulley 142 at one end. The pulley 142 is mounted on the bolt shaft 180 and is journalled by ball bearings 182. The pivoted structure 140 is connected to the housing 220. The damping mechanism is shown generally at 56 with damping elements 212 having one plurality of damping elements attached by splines 500 to the outer housing 220 in alternate fashion with a second plurality of damping elements fixed interiorly by splines 505 to the interior shaft 215.

Figure 4:
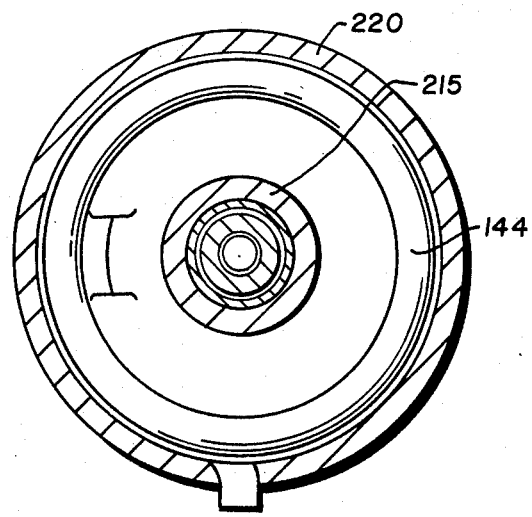
FIG. 4 is a cross-sectional view of a dampening body of the first embodiment taken along the line 4—4 of FIG. 2.

FIG. 4 is a cross-sectional view of the first embodiment showing the coil spring 144 which biases the pivoted structure 140 (see FIGS. 2 and 3). The coil spring 144 is within an outer housing 220, and surrounds the interior shaft 215.

Figure 5:
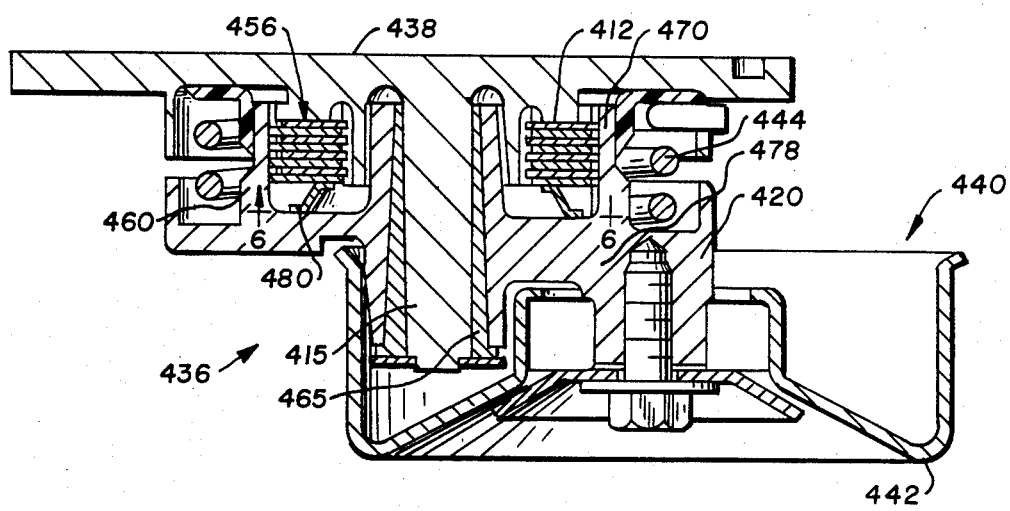
FIG. 5 is a cross-sectional view similar to FIG. 2 of a second embodiment.

In a second embodiment of the present invention shown in FIG. 5 the damping of pivotal movement is constant rather than variably proportionate which was the case in the first embodiment of the present invention. As shown in FIG. 5 of the drawings, the belt tensioner 436 includes a fixed bracket plate 438 in a stationary position with respect to the engine block. The belt tensioner also includes a pivoted structure 440 which is mounted with respect to the fixed bracket plate 438 and associated structures for a pivotal movement about a fixed axis between the first and second limiting positions. The pivoted structure 440 carries a belt engaging pulley 442 for rotational movement about a second axis parallel with the first axis. A coil spring 444 is mounted between the fixed bracket plate 438 and pivoted structure 440 for resiliently biasing the latter to move in a direction away from the first limiting position thereof toward the second limiting position with a spring force which decreases as the pivoted structure is moved in a direction away from the first position toward the second position. The second position of the belt tensioner 436 corresponds generally with the dotted line position shown in FIG. 1.

In accordance with the principals of the present invention, the belt tensioner 436 also includes a damping body generally located at 456 which serves in operation to provide damping by a damping force which is constant.

The arm 478 connected to the pivoted structure 440 forms an integral part of the spring housing 420. The spring 444 may for example, be a torsion spring. The spring housing 420 is an integral part of the damping body housing 460. The pivoting arm 478, spring housing 420, and damping body housing 460 all rotate and pivot about a center shaft 415 which is rigidly connected to the fixed bracket plate 438. The center shaft 415 may for example, be formed from steel, or cast as one piece with the fixed bracket plate 438 and hard anodized. The pivoted structured 440 which ultimately rotates and pivots about the center shaft 415 has a sleeve type bearing 465 which may for example, be a Garlock bearing and for example, be formed of steel backed with teflon, lead, brass or the like.

The damping body 456 includes two sets of frictionally slidable elements 412 each set of which has the damping elements 412 alternately fixed. A first set of damping elements is fixed to the pivoted structure 440 via the pivoted arm structure 478 and a second set of damping elements is fixed to the fixed bracket plate structure 438. The peripheral means for engagement include for example, splines fixed by complementary splines. The damping elements may also be fixed by interior means including for example, circular or elongated holes, or arms, fixed by rigid perpendicular pins (not shown). The first set of damping elements may be composed of one material and the second set of damping elements may be composed of a second material; or the damping elements may be of different materials throughout the damping body 456. The damping elements may be made from materials including for example, nylon, steel, bronze or fiber. One set of damping elements may be of one thickness and the second set of damping elements may be of a second thickness, or the damping elements may be of different thicknesses throughout the damping body 456. Constant pressure is applied to the damping elements by means of a spring 480 which may be for example, a Bellville washer or symmetrically disposed coil springs.

The spring 444 operates to keep the pivoted structure 440 in a tensioned state and upon the application of a stress on the pivoted structure 440, the spring 444 contracts to create greater spring force on the pivoted structure 440. The damping body spring 480 applies a constant pressure to the damping elements providing a constant damping force on the pivoted structure 440. The interaction of the damping elements where the damping elements are made of a high friction material such as elastomeric urethane or a low friction material such as Zytel has been previously discussed with regard to the first embodiment of the present invention. The utilization of a damping body which uses a stack of frictionally slidable elements is highly flexible by enabling fine adjustment of damping the pivoted structure 440 under various system operational circumstances.

Figure 6:
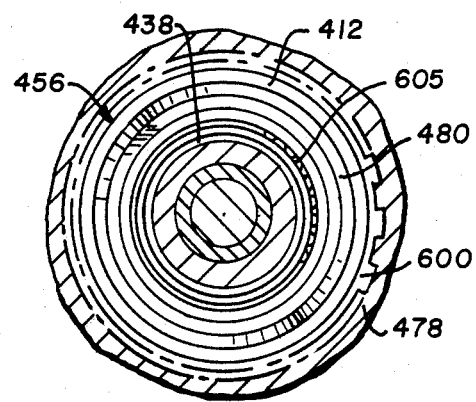
FIG. 6 is a cross-sectional view of a dampening body of a second embodiment taken along the line 6—6 of FIG. 3.

FIG. 6 shows a cross-sectional of, generally, the damping body 456, including damping elements 412. The damping elements 412 include a first plurality fixed by splines 600 to the pivoted arm structure 478. A second plurality of damping elements 412 is shown to be fixed by splines 605, interiorly, to the fixed bracket plate structure 438. A spring 480 applies constant pressure to the damping elements 412 to provide a frictional force.

While the present invention has been described in relation to the above exemplary embodiments it will be understood that various modifications may be made within the spirit and scope of the invention. While the objects of the present invention have been fully and effectively accomplished, it will be realized, however, that the foregoing exemplary embodiments have been shown and described for the purpose of illustrating the functional and structural principles of this invention and is subject to change without departure from such principles. Therefore, this invention includes all modifications encompassed within the spirit and scope of the following claims.

What is claimed is:

1. In a belt tensioning device comprising a fixed structure, a pivoted structure mounted with respect to said fixed structure for pivotal movement about a first axis between first and second limiting positions, a belt engaging pulley rotatably carried by said pivoted structure for rotational movement about a rotatational axis parallel with said pivotal axis, spring means acting between said fixed and pivoted structures for resiliently biasing said pivoted structure to move in a direction away from said first limiting position toward said second limiting position so as to tension a belt engaged by said pulley, and damping means for damping the pivotal movements of said pivoted structure about said pivotal axis, the improvement which comprises said damping means comprising:

a stack of damping elements having interengaging pairs of surfaces disposed transversely with respect to said pivotal axis so as to be slidable with respect to one another in spaced planes of revolution about said pivotal axis;

said stack including a first plurality of damping elements and a second plurality of damping elements which are disposed within the stack in alternate positions with respect to the damping elements of said first plurality;

means for connecting said first plurality of damping elements with said fixed structure, (1) against movement in the rotational planes of the interengaging surfaces therof and (2) for movement relative to one another in the axial direction of said pivotal axis;.

means for connecting said second plurality of damping elements (1) for movement with said pivoted structure about said pivotal axis so that the interengaging surfaces thereof will move in the rotational planes thereof with the pivoted structure and (2) for movement relative to one another in the axial direction of said pivotal axis; and means for supporting one end element of said stack against movement in an axial direction away from said stack so that an axial force component acting in said direction applied to the opposite end element of said stack will cause the pairs of interengaging surfaces of the stack elements to move together and create a predetermined sliding friction therebetween when said pivoted structure is moved with respect to said fixed structure about said pivotal axis so as to provide a predetermined damping of such movement.

2. The improvement as defines in claim 1 wherein said first and second plurality of damping elements are moved together by spring means separate from said belt tensioning means for applying a constant axial force component so as to provide constant damping of said pivotal movement of said pivoted structure.

3. The improvement as defined in claim 1 wherein said belt tensioning spring means is of rigid material and applies a spring force which decreases as said pivoted structure is moved in a direction away from said first position toward said second position, means for causing said belt tensioning spring means to move said first and second plurality of damping elements together by a variable axial force component of said spring force which is proportional to the decrease of said spring force as said pivoted structure is moved in a direction away from said first limiting position toward said second limiting position as aforesaid.

4. The improvement as defined in claim 2 wherein said fixed and pivoted structure include annular portions concentric with said pivotal axis and defining an annular space therebetween and a sleeve bearing in said annular space serving to mount said pivotal structure on said fixed structure for pivotal movement.

5. The improvement as defined in claim 4 wherein said damping elements are centrally apertured to receive said annular portions and said sleeve bearing therethrough.

6. The improvement as defined in claim 5 wherein each of said damping elements comprises a thin disk having opposed surfaces extending in spaced radial planes of revolution with respect to said pivotal axis.

7. The improvement as defined in claim 6 wherein said connecting means for one of said plurality of damping elements with the associated structure, comprises interengaging axially extending splines between the interior periphery of the disks thereof and the associated structure and said connecting means for the other of the said plurality of damping elements with the associated structure, comprises interengaging axially extending splines between the exterior periphery of the disks thereof and the associated structure.

8. The improvement as defined in claim 1 wherein said first plurality of thin elements is composed of a first material and said second plurality of thin elements is composed of a second material.

9. The improvement as defined in claim 8 wherein one of said first and second materials is steel and the other is a non-ferrous material.

10. The improvement as defined in claim 8 wherein each of said plurality of dampening elements is of a first thickness and each of said second plurality of dampening elements is of a second thickness, different from said first thickness.

11. The improvement as defined in claim 2, wherein said separate spring means is a leaf-spring which is constantly compressed against said stack of dampening elements causing constant friction among said elements.

12. The improvement as defined in claim 11, wherein said leaf-spring includes a "Bellville Washer" type spring.

13. The improvement as defined in claim 2, wherein said separate spring is at least two, annularly disposed coil springs.

* * * * *